Oct. 18, 1927.

A. KADOW

1,645,755

GATHERING MEANS FOR GLASS WORKING APPARATUS

Filed Sept. 1, 1922     6 Sheets-Sheet 3

INVENTOR
August Kadow,
By Owen Owen & Crampton.
Attys.

Oct. 18, 1927.  
A. KADOW  
1,645,755  
GATHERING MEANS FOR GLASS WORKING APPARATUS  
Filed Sept. 1, 1922  6 Sheets-Sheet 5

INVENTOR.  
August Kadow.  
By Owen Owen & Crampton  
Attys.

Patented Oct. 18, 1927.

1,645,755

UNITED STATES PATENT OFFICE.

AUGUST KADOW, OF TOLEDO, OHIO, ASSIGNOR TO THE LIBBEY GLASS MANUFACTURING COMPANY, OF TOLEDO, OHIO, A CORPORATION OF OHIO.

GATHERING MEANS FOR GLASS-WORKING APPARATUS.

Application filed September 1, 1922. Serial No. 585,588.

This invention relates to machinery for manufacturing glassware and more particularly to a mechanism for gathering the glass and forming it into blanks suitable for pressing, blowing or other treatment necessary for the production of the finished article. The invention is particularly useful in that type of machine which rotates continuously on a vertical axis and carries one or more units which successively act to gather material from a vessel or melting source and deliver it to means which operates automatically to shape the gathered portion into predetermined form.

The primary object of the invention is the provision of simple, efficient and novel mechanism for gathering of quantity of molten glass from a source of supply, and delivering it in blank form to a mechanism where it receives a predetermined shaping treatment to form the finished article.

A further object of the invention is to provide a gathering ram with a swinging gathering head, which is automatically operable by movements of the ram to have predetermined swinging movements relative thereto, whereby when in gathering position it stands in operative gathering relation to its carrying ram and when in blank discharging position it stands in a different position relative to the ram, and is operated by such latter movement to open and to discharge the gather therefrom when the ram is at a predetermined point in its blank delivery movement.

Further objects and advantages of the invention will be apparent from the following detailed description thereof.

While the invention in its broader aspect is capable of embodiment in numerous forms, a preferred embodiment thereof is illustrated in the accompanying drawings, in which,—

Referring to the drawings, 1 designates a standard or stationary bearing structure and 2 a rotary structure mounted for rotation on the standard 1 and adapted to support a plurality of gathering units in which latter the present invention particularly resides. This rotary structure also carries means or instrumentalities for shaping a gathered blank into a finished article, such means in the present instance, being adapted to shape the blank by mechanical pressure. The rotary structure 2 has upper and lower platform parts 3 and 4, respectively, and posts or uprights 5 rigidly connecting the outer edges of said parts.

Figure 1:
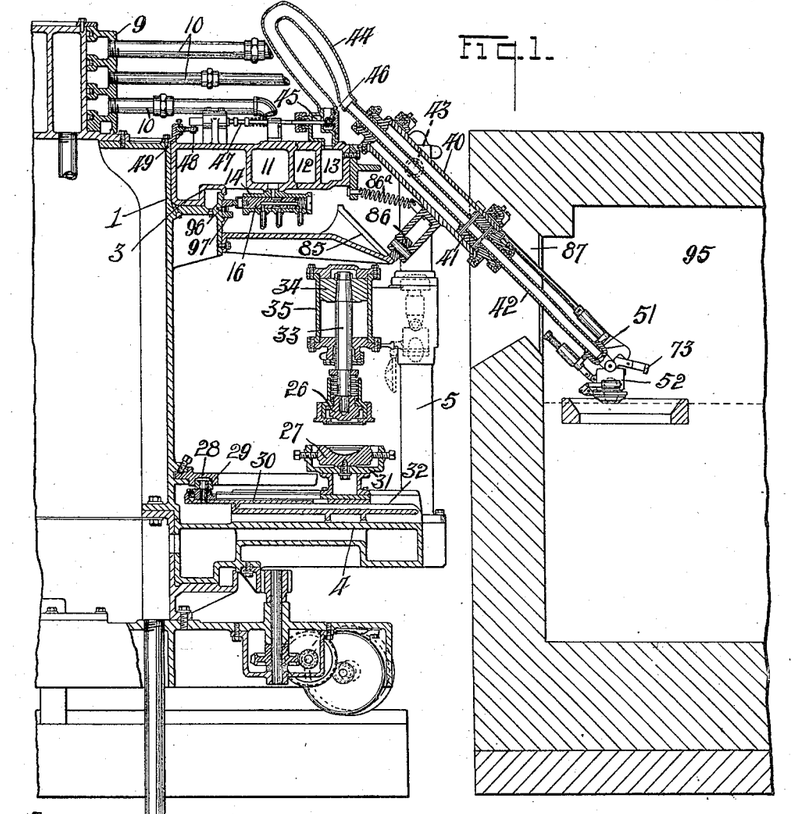
Fig. 1 is a fragmentary vertical section of a machine embodying the invention taken on substantially the line 1—1 in Fig. 4, with the blank gathering means in gathering position within a furnace.

In machines of this class it is common to provide the upper end portion of the standard 1 with three compartments 6, 7 and 8, one of which is in communication with a source of air pressure supply, another in communication with a vacuum creating or suction source. The part in which these chambers are disposed is of cylindrical form and a rotary member 9 is mounted thereon and connected to the rotary structure 2 to rotate therewith. The member 9 has three annular passages therein, each being in permanent communication with a respective one of the chambers 6, 7 and 8 and having communication through respective pipes 10 with annular chambers or manifolds 11, 12 and 13 provided in the upper platform 3 of the rotary structure, as shown in Fig. 1. In the present instance the chamber 11 is in communication with the air pressure supply, the chamber 12 is in communication with the gas supply, and the chamber 13 is in communication with the vacuum source.

A pair of valve casings 14 and 15 is provided for each gathering unit of the machine, and the valve chambers of these casings are in communication with the interior of the compressed air chamber 11. The two chambers are of cylindrical form and each is provided interiorly thereof with a plunger valve 16, which has one end projecting from the casing and provided with a roller 17 for bearing against a respective cam on a registering circumferential portion of the standard 1, the operating movements of the valve being radially of the standard. Each valve casing has a centrally disposed inlet opening 18 in its top portion and is provided in another portion thereof, in longitudinally spaced relation, with three openings 19, 20 and 21. The valve plunger 16 is provided with an annular circumferential channel 22, which is in permanent communication with the inlet opening 18 and is adapted by a longitudinal movement of the plunger to be placed in communication with either opening 19, 20, thus enabling pressure to be supplied from the chamber 11 to either outlet opening 19 or 20 as may be desired. The valve plunger has a longitudinally extending bore or passage 23 extending a distance therein from its inner end and provided with lateral passages 24 and 25, the former being adapted to communicate with the opening 19 when the valve is at the limit of its inward movement and the latter being adapted to communicate with the opening 20 when the valve is at the limit of its outward movement. The opening 21, which is an exhaust outlet, is in permanent communication with the adjacent end of the passage 23 through a portion of the valve chamber. The valve 16 is normally held at the limit of its outward movement by a spring 26'.

The valve in the casing 14 is intended to control the inward and outward movements of the associated gathering ram as hereinafter described, and the valve in the casing 15 is intended to control the movements of an article pressing plunger 26.

Figure 3:
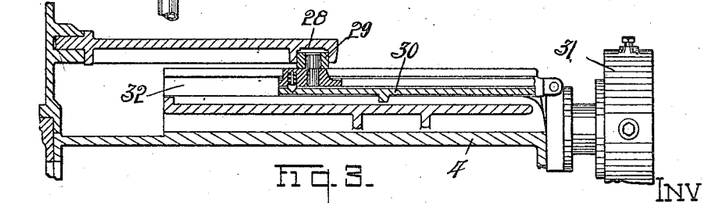
Fig. 3 is a fragmentary section of the machine with the blank shaping matrix in dumping position.

An article pressing unit is associated with each gathering unit and includes a matrix member 27, which is mounted for radial movements to place it, when in one position, in register with the plunger 26 and, when in another position, in register with the blank dumping or discharging position of the gathering ram, and also being movable to article dumping position, as hereinafter described. The radial movements of the matrix member are controlled by a cam 28, which encircles the standard 1 near its lower portion and has a cam groove which receives a roller 29 on an arm 30 extending inward from the matrix holder 31. The matrix holder and its arm 30 are guided for reciprocatory movements in a guideway 32 on the lower platform 4 of the rotary structure 2, and the holder and arm are pivotally connected to adapt the holder to be moved to dumping position at the outer edge of the platform 4, as shown in Fig. 3. The shaping plunger 26 is carried by a piston rod 33, the piston 34 of which is movable in a cylinder 35. Communication is provided between the openings 19 and 20 of the valve casing 15 and opposite ends of the cylinder 35 through tubes 36 so that movements of the associated valve 16 will cause compressed air to be admitted to first one end and then the other of the cylinder.

Figures 4, 5, 6:
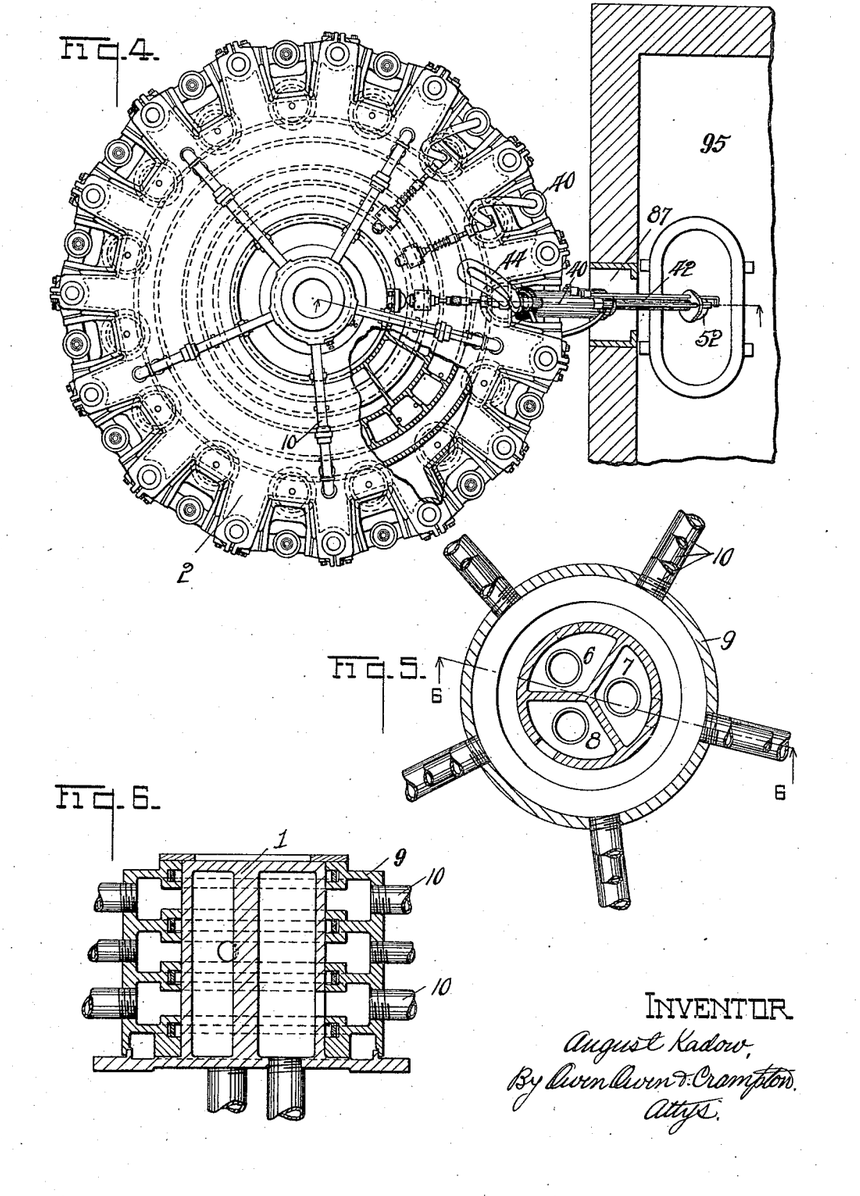
Fig. 4 is a plan view of a machine embodying the invention with parts broken away.
Fig. 5 is an enlarged cross-section of the upper central fluid distributing portion of the machine.
Fig. 6 is a section on the line 6—6, Fig. 5.

Each gathering unit includes a cylinder 40, a piston 41 movable in the cylinder and a ram 42 attached to the piston for reciprocatory movements therewith longitudinally of the cylinder. In one embodiment of the invention (Figs. 1, 2 and 4) the cylinder is pivoted at 43 between a pair of adjacent frame uprights 5 for vertical swinging movements in a plane which is longitudinal with and intersects the axis of rotation of the rotary structure 2. The ram 42 extends entirely through the cylinder 40 and from its ends through stuffing boxes therein and also through the piston 41, and is hollow throughout its length with its upper or inner end in communication with the vacuum chamber 13 through a flexible tube 44 and a valve controlled inlet passage 45. The valve 46 of said inlet passage has its stem 47 projecting through the passage casing toward the standard 1 and provided at its inner end with a roll 48 which at a predetermined point in its revolution with the rotary structure 2 engages a cam 49 on the standard 1 and imparts an opening movement of short duration to the valve 46 as hereinafter more fully described. The valve is normally held closed by a spring 50.

Figures 7, 8, 9, 10, 11, 12, 13:
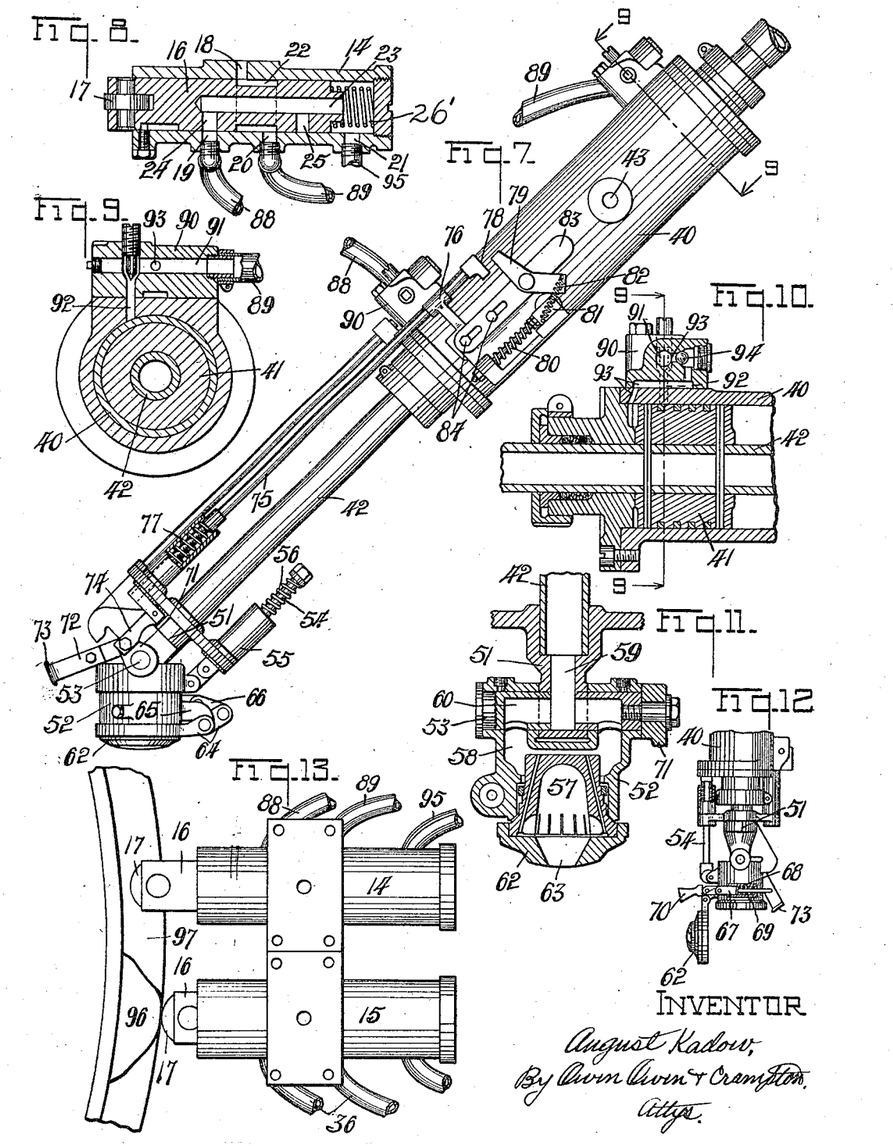
Fig. 7 is a side elevation of one form of gathering means embodying the invention with parts broken away.
Fig. 8 is an enlarged central longitudinal section of the fluid control means for the gathering means.
Fig. 9 is a cross-section on the line 9—9 in Fig. 7.
Fig. 10 is an enlarged fragmentary longitudinal section of the rear end portion of the gathering means.
Fig. 11 is an enlarged section of the forward end portion of the gathering means in discharging position with parts broken away.
Fig. 12 is an enlarged side elevation of the discharge end portion of the gathering means with the parts in blank discharging position.
Fig. 13 is an enlarged fragmentary plan of the fluid control means for the gathering means and the blank pressing means.

The forward or outer end of the ram 42 is provided with a casing or frame-part 51 to which a gathering head 52 is attached by a pivot 53 for limited pivotal movements relative to the ram in the plane of swinging movements thereof. The head 52 is normally retained in inclined gathering relation to the ram 42 by a stem 54, which is attached to and projects from a side of the head through a bearing part 55 of the casing or frame 51 and is encircled by a spring 56, which yieldingly acts to normally retain the head in its inclined gathering position with respect to the ram, as best shown in Fig. 7. When the ram 42 has been retracted a predetermined extent relative to the cylinder 40, the rear end of the stem 54 strikes the forward end of the cylinder 40, thus limiting the rearward movement of the stem so that during the continued movement of the ram the head 52 is caused to be swung to discharging position with its axis in longitudinal alignment with the ram axis, as shown in Fig. 12.

The gathering head 52 is provided with a blank receiving cavity 57 (Fig. 11), and this is in communication through a series of slots and apertures, as is customary in gathering heads of this character, with the interior suction chamber 58 of the head which chamber is in communication with the ram passageway through a passage 59 in the member 51, and passageway 60 provided in the pivot pin 53, which connects the frame member 51 and head 52. The outer end of the cavity 57 is closed by a bottom member 62 except for a suction opening 63 provided therethrough through which molten material is drawn. It is evident that when the bottom member 62 is in closed relation to the cavity 57 and is submerged in a quantity of molten metal, a charge of such metal may be drawn therethrough and into the cavity to fill the same when suction is present in the ram 42. This action is so well understood in the art as not to require further description.

Figure 2:
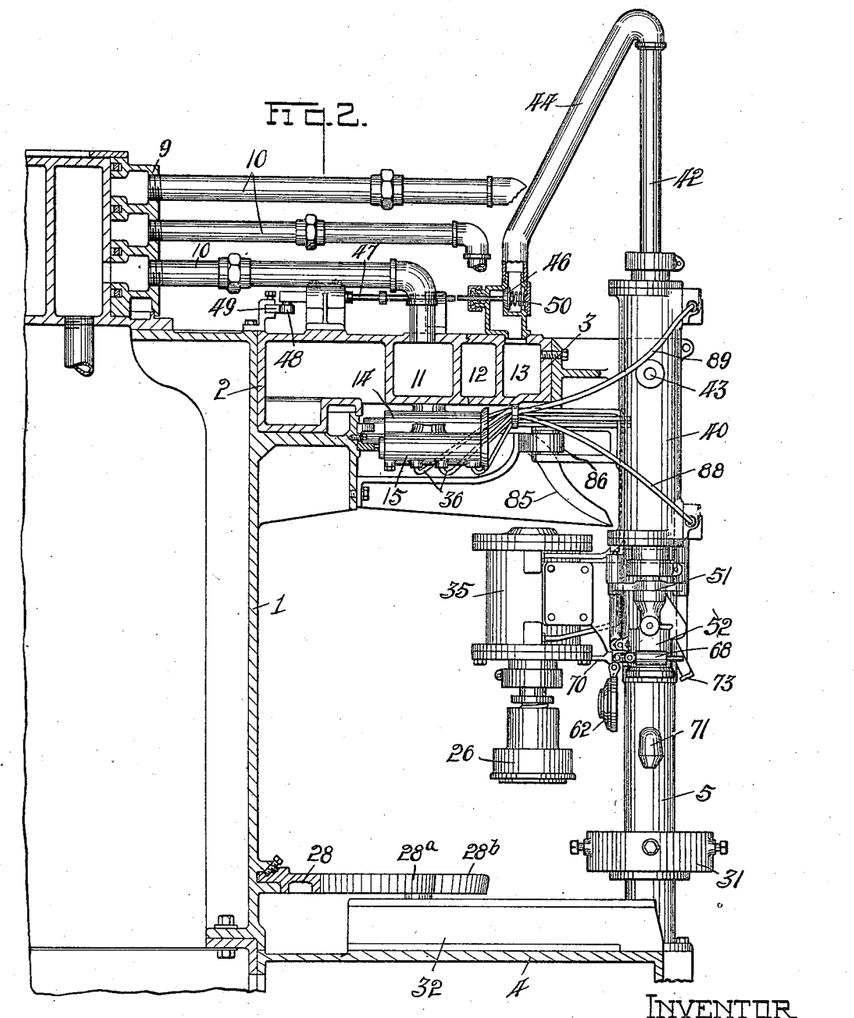
Fig. 2 is a similar enlarged view with the gathering means in full and in delivery position.

The member 62 is pivoted for swinging opening movements with respect to the gathering head and for such purpose has a lever arm 64 projecting from one side thereof and pivoted to an arm 65 projecting from a side of the head. The arm 64 projects beyond its pivot and is pivotally connected by a link 66 to a plunger 67, which extends through a casing 68 secured to a side of the head 52 for reciprocatory movements therein. A coiled compression spring 69 is disposed within the casing 68 and acts on the plunger 67 to normally retain the member 62 in closing relation to the gathering head. When the ram and its carrying cylinder 40 have been swung to vertical discharging position as shown in Fig. 2, the projecting end of the arm 64 strikes an aligned projection 70 on the cylinder 35 of the pressing means and causes an opening movement to be imparted to the bottom member as shown in Figs. 2 and 12. Upon an opening of the gathering head the gathered blank 71 (Fig. 2) drops therefrom and into the registering matrix member 27 of the pressing mold.

An arm 71 projects laterally from an end of the pivot pin 53 and has a fore-arm portion 72 projecting at an angle therefrom and provided at its free end with a blade 73, which, upon a downward swinging of the arm 71, 72, passes under the bottom member 62 and severs any glass hanging from the opening 63 thereof. A bar 74 is pivotally connected to the elbow portion of the arm 71, 72 and is connected to the lower end of a bar 75, which has a bearing at its lower end in the frame member 51 and at its upper end in a bearing 76 secured to a side of the cylinder 40 at its lower end portion. A coiled compression spring 77 encircles a portion of the bar 75 and acts thereon to normally retain the knife 73 in its raised inoperative position shown in Fig. 7. The upper end of the rod 75 is provided with a trip nose 78, which during the initial portion of an upward or inward movement of the ram 42 with respect to the cylinder 40 strikes against a pivoted finger 79 on the cylinder 40, the pivotal movements of which finger are resisted by a spring 80 which is stronger than the spring 77 so that the inward movement of the bar 75 with the ram is arrested sufficiently to cause a downward swinging of the knife 73 under the gathering head to sever any glass hanging therefrom as the head is retracted from gathering position. The spring 80 acts against a plunger 81 carried by the cylinder 40 and this plunger has a roller which engages the lever 79. A coiled contractile spring 82 yieldingly retains the lever in engagement with the plunger roll. The lever 79 is carried by a plate 83, which is secured to a side of the cylinder 40 by screws 84 for adjusting movements longitudinally thereof.

The swinging movements of the cylinder 40 and its ram 42 are controlled by a cam 85, which is fixed to the standard 1 and adapted to coact with a roll 86 on the inner side of the cylinder 40 to swing the ram outward into position to be projected through the receiving opening 87 in a furnace or pot when in register therewith and then to permit the cylinder and its ram to swing to vertical discharging position when the ram has been retracted from the opening 87. A contractile spring 86ª holds the cylinder 40 normally in its vertical position.

The reciprocatory movements of the ram 42 relative to the cylinder 40 are controlled by the valve 16 in the casing 14, the opening 19 in the valve casing being in communication with the lower end of the cylinder through a tube 88 and the valve casing opening 20 being in communication with the upper end of a cylinder through a tube 89. Each tube 88 and 89 connects with a respective boss 90 on the respective end of the cylinder 40 and has communication with the adjacent interior end of the cylinder through a passage 91 and by-pass 92 and also through a valve controlled by-pass 93, in which a check valve 94 (Fig. 10) is disposed. The by-pass 93 communicates with the extreme end of the cylinder while the by-pass 92 communicates with the cylinder in slightly spaced relation to its end. When the valve 16 in the casing 14 is at the limit of its inward movement relative to the casing, as shown in Fig. 8, the casing opening 20 is then open to the compressed air supply chamber 11 so that compressed air is admitted to the upper end of the cylinder through the tube 89 to force the piston 41 and connected ram 42 to the limit of their outward movements, the exhaust from the lower end of the cylinder then taking place through the tube 88, casing opening 19 and passages 24 and 23 to the outlet or exhaust passage 21 which is in communication with the atmosphere through a tube 95. When the valve 16 has moved to the limit of its outward movement the opening 20 is placed in exhausting communication with the passage 23 and the opening 19 is placed in communication with the supply chamber 11 so that compressed air is admitted to the lower end of the cylinder 40 to effect a forcing of the piston and ram to the limits of their upward strokes. It will be apparent that while compressed air may enter the cylinder 40 through both passages 92 and 93 in an end thereof, the exhaust from the cylinder through such end can only take place through the passage 92 and 91 as the check valve 94 in the by-pass 93 is closed by the exhaust pressure thereby causing the air which is disposed in the cylinder between the passages 92 and 93 to serve as cushioning means for the piston at the limit of its respective stroke.

The operation of the machine is as follows:—

Figures 14, 15, 16, 17, 18:
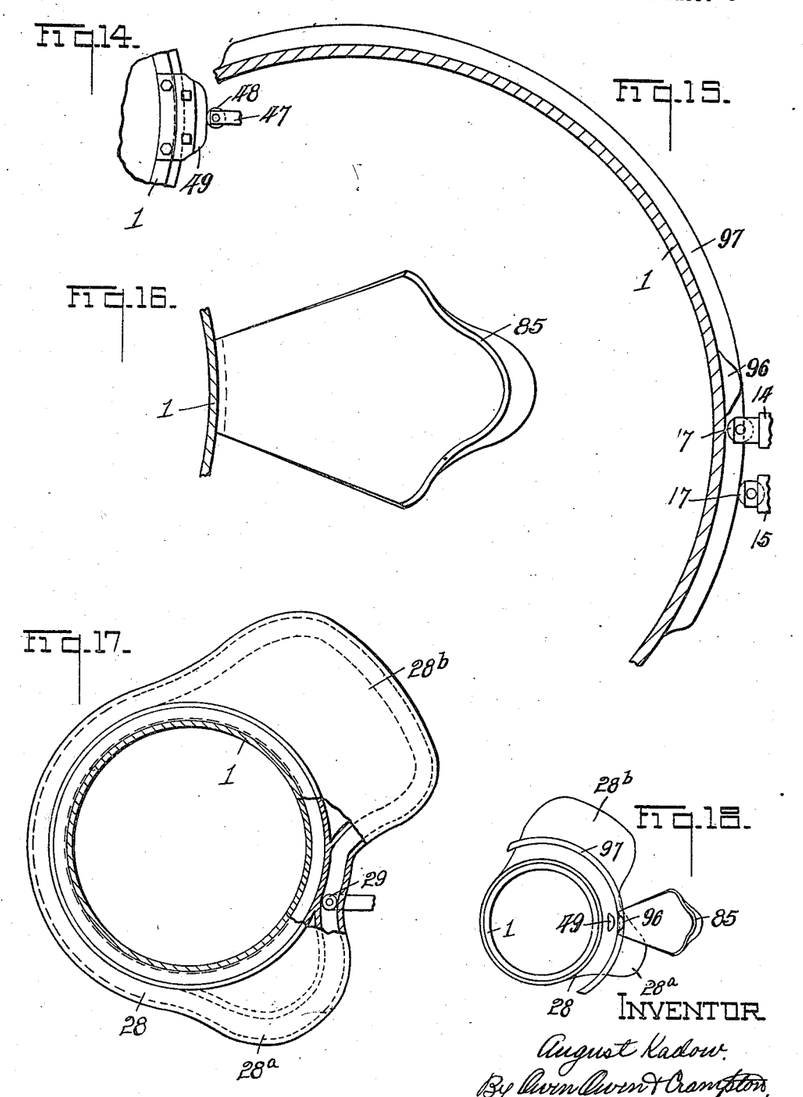
Fig. 14 is a fragmentary detail of the vacuum control means for the gathering means.
Fig. 15 is an enlarged fragmentary detail of the air pressure control means for the gathering means and the pressing means.
Fig. 16 is an enlarged plan view of the cam which controls the swinging movements of the gathering means.
Fig. 17 is a detail of the cam for controlling the movement of the matrix member of the blank pressing means with a part broken away.
Fig. 18 is a diagrammatical view of the relative positions of the different control cams of the machine.

When a gathering unit is approaching the furnace 95 in which the gather takes place, the gathering ram thereof stands in vertical position, the roll 86 thereon not yet having moved into engagement with the operating cam 85, the matrix 27 of the pressing unit stands in substantially its retracted position with the plunger 26 of such unit in elevated position, and the valve 16 of the casing 14 stands at the limit of its outward movement relative to such casing, in which position the ram 42 is held at the limit of its upward movement relative to the cylinder 40. The valve 46 in the suction line of the ram is also closed. As the ram moves into register with the furnace opening 87 it is forced outward to inclined position by the cam 85 and practically simultaneously therewith, the roll 17 of the ram control valve 16 passes onto a registering cam 96, which opens the compressed air line to the upper end of the cylinder 40 and causes a forward movement of the ram to project its head 52 in gathering position within the furnace. The cam 96 is short so that the roll 17 almost immediately passes therefrom and permits a movement of the associated valve 16 to place the lower end of the cylinder 40 in communication with the compressed air supply, thus causing a retraction of the ram to its initial position and the cam 85 then permits a downward swinging of the cylinder and ram to vertical blank discharging position. During the momentary pause of the ram head 52 in gathering position within the furnace, the valve 46 in the ram suction line is opened by reason of the roll 48 moving into engagement with the cam 49, thus causing the sucking of a charge of molten metal into the head cavity 57 from the batch of molten metal in the tank in which the suction end of the head is submerged. The valve 46 remains open only during the sucking in of the glass into the gathering head and for a short time thereafter until the gathered glass has been sufficiently cooled to prevent flowing from the head. A chilling of the gathered glass takes place very rapidly due to the considerably lower temperature of the gathering head. Almost immediately after the ram has begun its retracting movement, after the gathering of a charge in the head cavity thereof, the nose 78 on the bar 75 engages the trip lever 79 and causes a swinging of the knife 73 to sever the glass stream hanging from the mouth of the gathering head. When the nose 78 has tripped past the lever 79 by reason of the upward pressure of the bar thereagainst overcoming the tension of the spring 80 the bar 75 and its knife return to normal position by the action of the spring 77. When the ram is near the limit of its upward or retracted movement, the member 54 coacts with the lower end of the cylinder 40 and causes an outward movement of the member against the tension of the spring 56 to effect a swinging of the gathering head 52 from its inclined gathering relation to the ram to its axially aligned relation thereto. When the ram and cylinder have swung to substantially vertical or dumping position, the arm 64 of the bottom member 62 strikes the aligned stationary member 70 and causes a swinging of the bottom member 62 to open position against the tension of the spring 69 thereby permitting the gathered blank 71 to drop from the gathering head into the vertically registering pressing matrix 27, which now stands in vertically aligned receiving relation to the head, as shown in Fig. 2, due to the control roller 29 thereof passing through the projecting portion 28ᵃ of the cam 28. The matrix mold 27 is now retracted into register with the pressing plunger 26 by the action of the control cam 28 after which the roll 17 of the control valve which is disposed within the valve casing 15 passes from the prolonged outwardly projecting portion of its control cam 97 thereby moving the associated valve 16 to permit compressed air to pass to the upper end of the cylinder 35 and force the plunger 34 and attached shaping die 27 downward into pressing relation to the matrix mold. This pressing operation takes place during approximately one-half of a revolution of the rotary structure 2, as evidenced by the diagrammatical view of the cams shown in Fig. 18, after which the plunger 26 is raised by reason of the roll 17 of the associated valve passing onto the cam portion 97. Immediately after the pressing plunger 27 is retracted from the matrix mold the roller 29 passes through the outwardly projecting portion 28ᵇ of the cam 28 which moves the matrix mold to the dumping position shown in Fig. 3.

Figures 19, 20:
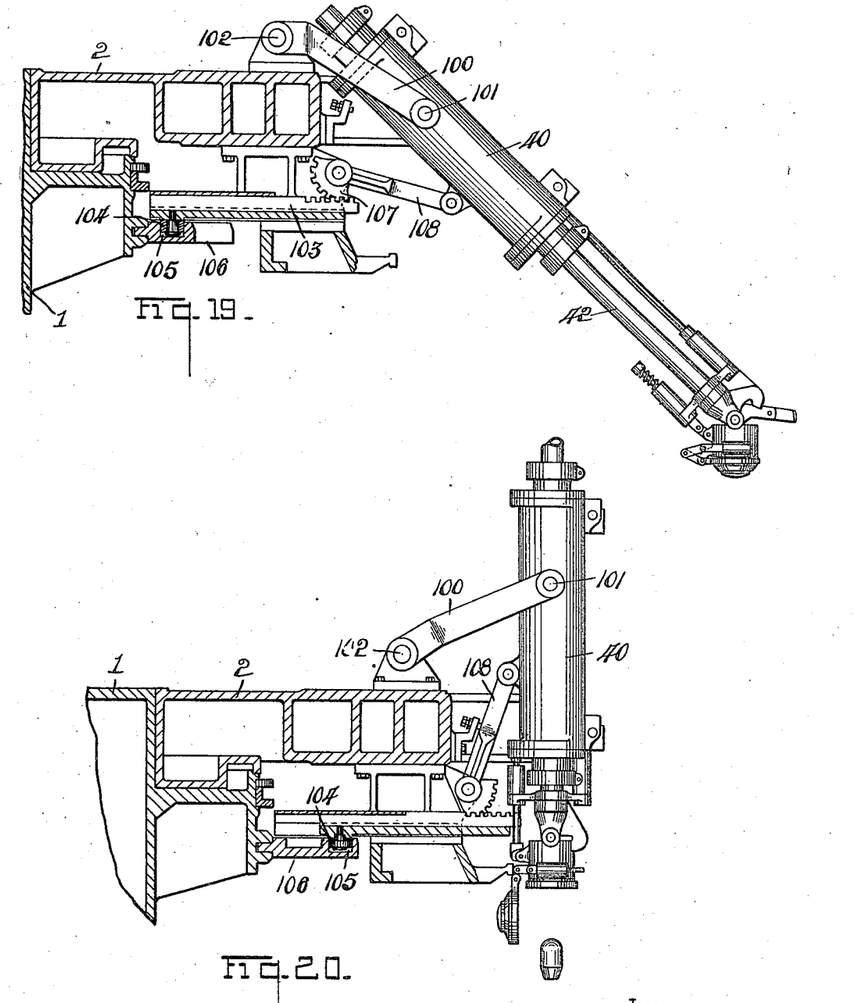
Fig. 19 is a fragmentary vertical section of a machine including a gathering unit with a modified form of mounting, the ram being in gathering position
Fig. 20 is an enlarged similar view with parts in full and the gathering means in blank discharging position.

In Figs. 19 and 20 the ram carrying cylinder 40 is shown as mounted for combined swinging and axial movements instead of true pivotal swinging movements illustrated in Figs. 1 and 2. In this form of mounting for the ram carrying cylinder, the cylinder is connected to the upper platform of the rotary structure 2 by a pair of links 100, one of which is disposed at each side of the cylinder and pivotally connected thereto in axial alignment at 101 and pivotally connected at their opposite ends to the rotary structure at 102. It is evident that these links support the cylinder for both vertical swinging and axial movements. A rack bar 103 is mounted for radial reciprocatory movements on the rotary structure 2 below the point of connection of the links 100 therewith and is caused to have predetermined reciprocatory movements radially of the rotary structure 2 by reason of a roll 104 on the bar travelling in a cam groove 105 provided in a part 106 which is fixed to and encircles the standard 1. A segmental pinion 107 is pivoted to the frame structure 2 above the outer end portion of the rack bar 103 and is in meshing engagement therewith. The pinion segment has an arm 108 rigidly projecting therefrom and pivoted at its outer end to the inner side of the cylinder 40 near its lower end or preferably below the point of connection of the links 100 therewith. It is evident that any movement of the pinion 107 and its arm 108 relative to the carrying frame 2 will impart a vertical swinging and an axial movement to the cylinder 40, such movements being guided by the links 100. Otherwise the action of the ram and its operating parts is exactly the same as previously described.

It will be understood that the term "swinging" as used in the claims with reference to a gathering ram and its cylinder does not necessarily mean a true pivotal swinging of the same, but is used in its broader sense to apply to any swinging movement of such parts whether by a true pivotal movement or by a combined pivotal and axial movement or otherwise to move the ram from gathering position to discharging position, and vice versa.

I wish it understood that my invention is not limited to any specific construction, arrangement or form of the parts, as it is capable of embodiment in numerous forms without departing from the spirit of the claims.

Having thus described my invention, what I claim as new, and desire to secure by Letters Patent, is,—

1. In a machine of the class described, a gathering unit including a ram, fluid controlled means for imparting reciprocatory movements to the ram, a gathering head movably carried by the ram and normally standing in one position of its movement relative thereto, and means dependent upon movement of the ram and automatically operable to move the head to a different predetermined position relative to the ram when the ram is at a predetermined point in its movement relative to the control means.

2. In a machine of the class described, a gathering unit including a cylinder, a fluid controlled piston operating in the cylinder, a ram fixed to the piston and movable therewith, a gathering head movably carried by the ram, and means normally holding the head in one position relative to the ram and coacting with the cylinder to impart a predetermined movement to the head relative to the ram when the ram is at an intermediate point in its movement relative to the cylinder.

3. In a machine of the class described, a gathering unit mounted for swinging movements and having a reciprocally movable ram and a gathering head pivotally carried by the ram, and means operable to hold the head in one position relative to the ram when the ram is projected in gathering position and to move the head to a different position relative to the ram when the ram is retracted a predetermined extent.

4. In a machine of the class described, a gathering unit mounted for swinging movements in a vertical plane and including a reciprocally movable ram having a pivoted gathering head, and means connecting the head and ram and operable to normally hold the head in gathering relation to the ram and automatically operable at an intermediate point in a reciprocatory movement of the ram to move the head to discharging relation to the ram.

5. In a machine of the class described, a rotary structure, a gathering unit carried for vertical swinging movements thereby and having a reciprocally movable ram and a gathering head pivotally carried by the ram and normally standing in one position relative to the ram, means for imparting predetermined swinging movements to the gathering unit during a predetermined portion of its movement with the rotary structure, and means operable to impart a predetermined movement to the gathering head relative to the ram when the ram is at a predetermined point in its reciprocatory movements.

6. In a machine of the class described, a rotary structure, a gathering unit carried by the structure for swinging movements relative thereto and including a cylinder, a ram carried by the cylinder for reciprocatory movements relative thereto and a gathering head pivotally carried by the ram and normally standing in one position of its movement relative thereto, means for imparting predetermined swing movements to the gathering unit while the rotary structure is rotating, and means carried by the ram in connection with the head and operable by coaction with the cylinder at a predetermined point in a retracting movement of the ram to move the head to discharging position relative to the ram.

7. In a machine for the class described, a gathering unit mounted for movements from gathering to discharging positions and vice versa, and including a cylinder, a ram reciprocally movable longitudinally of the cylinder, a gathering head pivotally carried by the ram, and means carried by the ram and connected to the head to normally retain the head in tilted gathering position relative to the ram and operable by coaction with the cylinder at an intermediate point in a retracting movement of the ram to move the head to discharging position relative to the ram.

8. In a machine of the class described, a rotatable carrier, a pivot mounted on the carrier, a gathering head, means to swing the head about the pivot while the carrier is rotating, and means to move the head towards and away from the pivot while the carrier is rotating.

9. In a machine of the class described, a carrying structure, a gathering unit carried by the structure for swinging movements relative thereto and having a gathering head with a bottom member pivoted thereto, an arm projecting from the bottom member, a plunger carried by the head and having connection with the arm, and means acting on the plunger to cause it to normally retain the bottom member in closing relation to the gathering head, the arm being adapted to coact with a registering part of the carrying structure to impart an opening movement to the bottom member when the gathering unit has been swung to a predetermined position relative to the carrying structure.

10. In a machine of the class described, a carrying structure, a gathering unit carried for swinging movements by the structure and having a reciprocally movable ram, a gathering head pivotally carried by the ram and a normally closed bottom member for the head, means automatically operable to impart a predetermined movement to the head relative to the ram when the ram is at a predetermined point in its reciprocatory movement, and means automatically operable to move the bottom member to open position when the gathering unit has been swung to a predetermined position with respect to the carrying structure.

11. In a machine of the class described, a carrying structure, a gathering unit carried by said structure for swinging movements relative thereto and including a cylinder, a ram reciprocally carried by the cylinder, a gathering head pivotally carried by the ram, and a bottom member pivoted to the head for closing the bottom thereof, means normally retaining the head in one position relative to the ram and operable by coaction with the cylinder at a predetermined point in a retracting movement of the ram to move the head to a different position relative to the ram, and means normally retaining the bottom member in closed relation to the head and operable by coaction with a part of the carrying structure to move the bottom member to open position when the gathering unit has been swung to a predetermined position.

12. In a machine of the class described, a rotary structure, a gathering unit including a cylinder carried by the structure for swinging movements relative thereto, a fluid controlled ram carried by the cylinder for reciprocatory movements relative thereto, a carrying head pivotally carried by the ram, and a bottom member pivoted to the head, means for imparting predetermined swinging movements to the gathering unit when the rotary structure is rotated, means normally retaining the head in tilted gathering positition relative to the ram and operable to move the head to discharging position relative to the ram when the ram has been retracted a predetermined extent relative to the cylinder, and means normally retaining the bottom member in closed relation to the head and operable in coaction with a part of the rotary structure to open the bottom member when the gathering unit has been swung to discharging position.

13. In a machine of the class described, a gathering unit including a cylinder, a ram carried by the cylinder and fluid actuated to have reciprocatory movements relative thereto, a gathering head carried by the ram, a knife carried by the ram for swinging movements across a part of the head, means normally holding the knife in inoperative position relative to the head, and trip means carried by the cylinder and operable in coaction with said first means to impart a predetermined movement to the knife relative to the head during a predetermined retracting movement of the ram relative to the cylinder.

14. In a machine of the class described, a gathering unit including a cylinder, a fluid controlled ram reciprocally movable longitudinally of the cylinder, a gathering head carried by the ram, a knife mounted for swinging movements across a part of the head, means normally retaining the knife in inoperative position and including a rod carried by the ram for reciprocatory movements longitudinally of the cylinder, and yielding trip means for engagement with the rod during a predetermined portion of its movement relative to the cylinder to impart an operating movement to the knife and then to permit the knife to return to inoperative position.

15. In a machine of the class described, a rotary structure, a cylinder carried for swinging movements by the structure, means for imparting predetermined swinging movements to the cylinder while the structure is rotating, a piston in the cylinder, a hollow ram fixed to the piston for movements therewith and extending longitudinally through the cylinder, a gathering head carried by the ram with its gathering cavity in communication with the ram interior, means operable to permit the admission and exhaust of fluid pressure to and from the cylinder at opposite sides of the piston at predetermined points in a movement of the rotary structure, and means operable to exhaust air from the gathering head and ram at a predetermined point in a movement of the structure.

In testimony whereof I have hereunto signed my name to this specification.

AUGUST KADOW.